(12) United States Patent
Harvey et al.

(10) Patent No.: US 6,359,092 B1
(45) Date of Patent: Mar. 19, 2002

(54) WATER-WHITENING RESISTANT LATEX EMULSION PRESSURE SENSITIVE ADHESIVE AND ITS PRODUCTION

(75) Inventors: Raymond Scott Harvey, Worthington; Harvey Joseph Richard, Columbus, both of OH (US)

(73) Assignee: Ashland Chemical, Inc., Columbus, OH (US)

( * ) Notice: Subject to any disclaimer, the term of this patent is extended or adjusted under 35 U.S.C. 154(b) by 0 days.

(21) Appl. No.: 09/567,855

(22) Filed: May 9, 2000

(51) Int. Cl.[7] ................ C09J 125/14; C09J 125/18; C09J 129/10; C09J 133/08; C09J 141/00
(52) U.S. Cl. ................ 526/287; 524/547; 524/558; 524/560; 524/561; 524/577; 524/817; 524/833; 526/318; 526/318.4; 526/318.45; 526/911; 428/355 AC
(58) Field of Search ................ 524/547, 558, 524/560, 561, 577, 817, 825, 833; 526/287, 318, 318.4, 318.45, 911; 428/355 EN, 355 AC

(56) References Cited

U.S. PATENT DOCUMENTS

| | | | |
|---|---|---|---|
| 5,332,854 A | * 7/1994 | Yokota et al. | 558/33 |
| 5,620,796 A | * 4/1997 | Kawabata et al. | 428/355 AC |
| 5,663,241 A | * 9/1997 | Takamatsu et al. | 525/328.6 |
| 5,885,708 A | * 3/1999 | Lu et al. | 428/353 |
| 5,889,105 A | * 3/1999 | Satsuma et al. | 524/560 |

FOREIGN PATENT DOCUMENTS

| | | | | |
|---|---|---|---|---|
| EP | 845518 | * | 6/1998 | C09J/133/06 |

* cited by examiner

Primary Examiner—David W. Wu
Assistant Examiner—Kelechi C. Egwin
(74) Attorney, Agent, or Firm—Mueller and Smith, LPA

(57) ABSTRACT

An aqueous, blush-retardant pressure sensitive adhesive (PSA) is made from an aqueous latex emulsion having an average particle size diameter of not substantially above about 100 nm and emulsified in the presence of an emulsifier consisting essentially of:

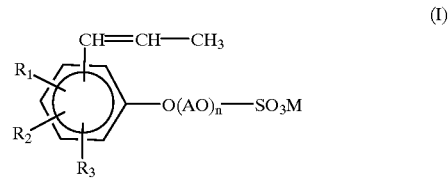

(I)

In structure I, $R_1$ is an alkyl, alkenyl, or aralkyl group containing between 6 and 18 carbon atoms, $R_2$ is H or $R_1$, $R_3$ is H or a propenyl group; A is an alkylene group of 2 to 4 carbon atoms, N is an integer ranging from 1 to 200, and M is an alkali metal, an ammonium ion, or an alkanolamine cation. Preferably, the emulsifier is:

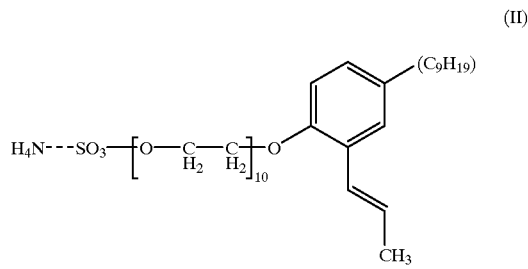

(II)

The preferred aqueous latex emulsion is prepared from a monomer mixture consisting essentially of at least one alkylacrylate having at least 4 carbon atoms in the alkyl chain, at least one ethylenically unsaturated carboxylic acid or its corresponding anhydride, and at least one styrenic monomer, and has a mean particle size diameter of less than or equal to about 100 nm.

7 Claims, No Drawings

WATER-WHITENING RESISTANT LATEX EMULSION PRESSURE SENSITIVE ADHESIVE AND ITS PRODUCTION

CROSS-REFERENCE TO RELATED APPLICATIONS

None

STATEMENT REGARDING FEDERALLY SPONSORED RESEARCH

Not applicable.

BACKGROUND OF THE INVENTION

The present invention relates to pressure sensitive adhesives based on aqueous latex emulsions and processes for the preparation of the adhesives. Pressure sensitive adhesives prepared according to the present invention have mean particle diameter sizes of less than or equal to about 100 nm and narrow particle size distributions. These pressure sensitive adhesives are particularly suitable for applications that require that the pressure sensitive adhesive maintain adhesion between the substrate and facestock when subjected to hot water spraying or immersion. In addition, the adhesives exhibit resistance to water-whitening or "blush", often determined by a cold or ice water immersion test. Hot water adhesion is required in applications such as bottle labels where the bottles are subjected to hot water spraying in washing operations. In general, resistance to water-whitening is desirable anywhere a pressure sensitive adhesive with transparent facestock or substrate is subjected to water or high humidity. Examples include labels on the sides of trucks, signs, and bottles.

Methods of providing water-whitening resistant latex emulsions for use in pressure sensitive adhesives are disclosed in the art. U.S. Pat. Nos. 5,286,843 and 5,536,811 disclose a process for improving the water-whitening resistance of pressure sensitive adhesives containing an aqueous latex emulsion and water soluble ions by removing the water soluble ions and adjusting the pH to at least about 6. The patents disclose that water-soluble ions may be removed by a number of techniques including centrifugation, dialysis, precipitation and deionization with ion exchange resins. The preferred method of removing the water-soluble ions is to contact the aqueous latex emulsion, the formulated pressure sensitive adhesive containing the aqueous emulsion or both with an ion exchange resin.

International Application WO 97/11996 discloses a process for preparing hot water-whitening resistant latex emulsions useful in pressure sensitive adhesive compositions. The process involves copolymerizing a monomer mixture containing at least one alkyl acrylate ester of an alcohol containing at least 4 carbon atoms, at least one polar co-monomer and at least one partially soluble co-monomer present in an amount of at least about 7 weight-%. Polymerization is carried out in the presence of at least one nonionic surfactant containing at least 8 moles of ethylene oxide and at least one anionic surfactant containing up to about 10 moles of ethylene oxide. The polymerization product is neutralized to produce an emulsion having a pH greater than 7 and containing particles having a volume average particle size diameter up to about 165 nm. An electrolyte may be added subsequent to polymerization to stabilize opacity of a film cast from the emulsion.

International Application WO 98/44064 discloses inherently tacky pressure sensitive adhesives prepared by emulsion polymerization of at least one monomer mixture comprising; at least one alkyl acrylate, the alkyl group of which has from 4 to 12 carbon atoms; at least one unsaturated carboxylic acid containing from about 3 to 5 carbon atoms and one styrenic monomer; wherein the particles have a mean diameter of 300 nm or less. The publication discloses a single stage preparation of aqueous acrylic emulsions in examples 4D, 4E, 4F, 4G and 4H with average particle sizes ranging from 245 nm to 139 nm. Each of the examples discloses the use of silane crosslinkers to improve blush resistance. The publication discloses a preferred method of preparation, which yields adhesives resistant to water-whitening and involves a sequential polymerization of a first and second monomer charge. None of the above references disclose a pressure sensitive adhesive that maintains adhesion in hot water environments and is resistant to water-whitening.

BRIEF SUMMARY OF THE INVENTION

An aqueous, blush-retardant pressure sensitive adhesive (PSA) is made from an aqueous latex emulsion having an average particle size diameter of not substantially above about 100 nm and emulsified in the presence of an emulsifier consisting essentially of:

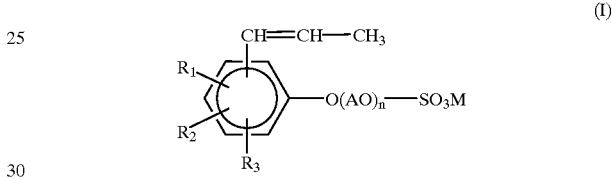

(I)

In structure I, $R_1$ is an alkyl, alkenyl, or aralkyl group containing between 6 and 18 carbon atoms, $R_2$ is H or $R_1$, $R_3$ is H or a propenyl group; A is an alkylene group of 2 to 4 carbon atoms, N is an integer ranging from 1 to 200, and M is an alkali metal, an ammonium ion, or an alkanolamine cation. Preferably, the emulsifier is:

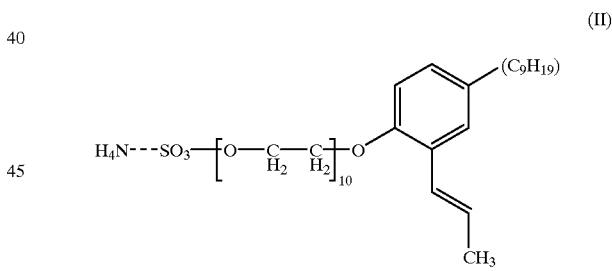

(II)

The preferred aqueous latex emulsion is prepared from a monomer mixture consisting essentially of at least one alkylacrylate having at least 4 carbon atoms in the alkyl chain, at least one ethylenically unsaturated carboxylic acid or its corresponding anhydride, and at least one styrenic monomer, and has a mean particle size diameter of less than or equal to about 100 nm.

Pressure sensitive adhesives of the present invention are useful in clear label applications, marking films, etc. The inventive pressure sensitive adhesives maintain adhesion and transparency (water-whitening resistance) when immersed in boiling water for 10 minutes. The inventive PSA's also possess good wet-out.

DETAILED DESCRIPTION OF THE INVENTION

The polymerization is carried out in the presence of a reactive emulsifier or surfactant as described below. A redox type free radical initiator system is used in an amount sufficient to promote free radical polymerization of the monomers. Once the polymerization is complete it may be desirable to adjust the pH of the latex emulsion in order to enhance its stability. Other ingredients commonly used in the preparation of aqueous latex emulsions such as buffering agents, chain transfer agents, and the like may be present. General latex technology is discussed in, Kirk-Othmer, *Encyclopedia of Technology*, [4th Ed.], vol. 15, p. 51–65; which is hereby incorporated by reference. In addition to the aqueous latex emulsion, the pressure sensitive adhesive may also contain additional components such as, biocides, wetting agents, defoamers, tackifiers, etc.

The reactive surfactant or emulsifier consists essentially of a compound represented by the following general structure:

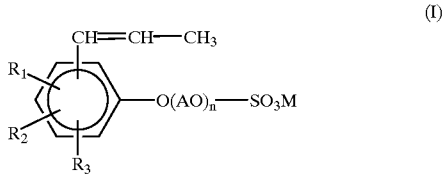
(I)

In structure I, $R_1$ is an alkyl, alkenyl, or aralkyl group containing between 6 and 18 carbon atoms, $R_2$ is H or $R_1$, $R_3$ is H or a propenyl group; A is an alkylene group of 2 to 4 carbon atoms, N is an integer ranging from 1 to 200, and M is an alkali metal, an ammonium ion, or an alkanolamine cation. This reactive emulsifier can be made in accordance with the procedure described in U.S. Pat. No. 5,332,854, the disclosure of which is expressly incorporated herein by reference.

Preferably, the emulsifier has the following general structure:

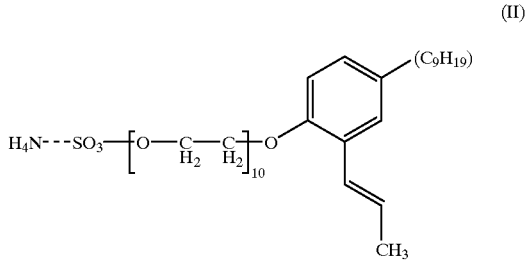
(II)

This preferred emulsifier is commercially available from Montello (Tulsa, Okla.) as Hitenol BC-10, poly(oxy-1,2-ethanediyl),α-sulfo-ω-[4-nonyl-2-(1-propenyl)phenyoxyl]-branched ammonium salts; yellowish brownish viscous liquid, 97.0% actives, combined sulfuric acid content of 8.70–9.70%, pH of 6.5–8.5 (1% aqueous solution). The pendant double bond is reactive in the latex emulsion preparation if a slightly higher temperature is used, higher amounts of redox catalyst are employed, and a hydrophilic monomer is included in the monomer mix. Typically, less than 4 wt-% of the reactive surfactant based on the total weight of the latex, is used.

While use of a reactive emulsifier can be employed with a variety of latex emulsions for formulating the novel PSA's, a preferred latex emulsion is disclosed in commonly-assigned application Ser. No. 09/290,159, filed on Apr. 12, 1999. The monomers used to prepare such aqueous lattices include alkyl acrylates, ethylenically unsaturated carboxylic acids and their corresponding anhydrides and styrenic monomers.

Alkyl acrylates are alkyl esters of acrylic or methacrylic acid having at least 4 carbon atoms in the alkyl portion of the molecule. Examples include butyl acrylate, isobutyl acrylate, heptyl acrylate, octyl acrylate, isooctyl acrylate, 2-ethylhexyl acrylate, and isodecyl acrylate. A single alkyl acrylate or mixtures of more than one alkyl acrylate can be used. A preferred alkyl acrylate is 2-ethylhexyl acrylate. The alkyl acrylate monomers are present in the monomer mixture in an amount from about 50 wt-% to about 90 wt-% and more preferably from about 60 wt-% to about 65 wt% based on the total weight of the monomer mixture.

Examples of ethylenically unsaturated carboxylic acids and their corresponding anhydrides used in the present invention include acrylic acid, methacrylic acid, maleic acid, fumaric acid, itaconic acid, beta-carboxyethyl acrylate and maleic anhydride. A single ethylenically unsaturated carboxylic acid or its corresponding anhydride or mixtures thereof can be used. A preferred carboxylic acid is beta-carboxyethyl acrylate. The ethylenically unsaturated carboxylic acids or their corresponding anhydrides are present in the monomer mixture in amounts from about 5 wt-% to about 10 wt-%, more preferably from about 6 wt-% to about 8 wt-% based on the total weight of the monomer mixture.

Examples of styrenic monomers used in the present invention include styrene, t-butyl styrene, dimethyl styrene, and vinyl toluene. A preferred monomer is styrene. The styrenic monomers are present in the monomer mixture in amounts ranging from about 15 wt-% to about 40 wt-%, and advantageously from about 28 wt-% to about 34 wt-%, based on the total weight of the monomer mixture.

A redox type free radical initiator system is used to promote polymerization of the monomers. The initiator is peroxide or hydroperoxide such as t-butyl hydroperoxide. The reducing agent used in the redox system is zinc formaldehyde sulfoxylate, sodium formaldehyde sulfoxylate, ascorbic acid, isoascorbic acid, sodium metabisulfite and the like. A preferred redox type system consists of t-butyl hydroperoxide and zinc formaldehyde sulfoxylate.

The aqueous latex emulsions, which form the basis of the pressure sensitive adhesives of the present invention, are prepared in a single stage synthesis with or without a seed in the reaction vessel prior to beginning the monomer feed. Reaction temperatures during the monomer feed can range from about 50° C. to about 90° C. In a preferred method of preparing the aqueous latex a pre-emulsion, an aqueous solution of the initiator, and an aqueous solution of a reducing agent are prepared in separate vessels. A reaction vessel is charged with deionized water, an anionic surfactant and a predetermined amount of initiator. The mixture in the reaction vessel is heated with stirring and up to 20 wt % of the pre-emulsion, more preferably up to 8 wt-% and most preferably 4 wt-% is added to the reaction vessel along with a predetermined amount of the reducing agent to form the seed. In small batches such as laboratory size synthesis the predetermined amount of reducing agent, the "initial Zn hit", can be added before the initial pre-emulsion charge. In larger scale synthesis it is preferred that the predetermined amount of reducing agent is added after the initial pre-emulsion charge is added to the reaction vessel. After forming the seed, the contents of the reaction vessel are heated to a desired temperature and the pre-emulsion, initiator and the reducing agent are simultaneously metered into the reaction vessel with stirring. It has been found to be advantageous to mix the pre-emulsion and initiator. This can be accomplished by merging the pre-emulsion and initiator feed streams and passing the merged stream through a static mixer or by simply allowing the two feed streams to converge in a common feed line. On completion of the pre-emulsion feed, the contents of the reaction vessel are cooled and alternating predetermined amounts of the initiator and reducing agent are added to the reaction vessel with stirring. This alternating initiator/reducing agent addition is preferably performed at least once. Once the reaction is complete the pH may be adjusted. The pH of the aqueous latex emulsion is preferably adjusted to a pH of about 6 to about 9 and more preferably about 6 to about 7.5. For efficiency and economy an aqueous solution of ammonium hydroxide can be used to adjust the pH. Other bases that may be used include amines, imines, alkali metal and alkaline metal hydroxides, carbonates, etc.

In addition to the aqueous latex emulsion, the pressure sensitive adhesive composition advantageously contains biocides, wetting agents, defoamers, etc. Examples of suitable biocides include Kathon LX, commercially available as a 1.5% solution from Rohm & Haas and Metatin 910, commercially available from ACIMA. An example of a suitable wetting agent is Surfynol SE commercially available from Air Products, PLURONIC® type polyols commercially available from BASF Corp, and the like. Examples of defoamers include Drewplus T-1201 and Drewplus 1-191 commercially available from Ashland Specialty Chemical Company, and Rhodoline 6681, commercially available from Rhodia.

The pressure sensitive adhesives described above can be used to prepare articles such as tapes, labels, signs, marking films, and the like. In a typical construction the pressure sensitive adhesive is coated or otherwise applied to a release liner such as a siliconized paper, dried, and laminated to a facestock. Alternatively, the pressure sensitive adhesive is coated directly on a facestock. Examples of facestocks include cellulosics, metal foils, polycarbonates, polyethylene, polypropylene, polyethylene terephthalate, and vinyl films.

The pressure sensitive adhesives typically have a viscosity after adjusting the pH to between about 6 and about 8 of from about 1,000 to about 20,000 centipoises. The pressure sensitive adhesives exhibit a shear-thinning rheology such that it allows coating even on difficult to coat films. Conventional coating techniques can be used to apply the pressure sensitive adhesives. Such techniques include dipping, slot die, air knife, brush curtain, extrusion blade, reverse roll, squeeze roll coating, and the like.

While the invention has been described with reference to preferred embodiments, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

IN THE EXAMPLES

The following test procedures were used in the examples:
1. 180° Peel Test

PSTC-1 (November 1975), Pressure Sensitive Tape Council, Glenview, III. Results of this test are reported in pounds/inch for a 1 in strip.

2. 178° Shear Test

Modified PSTC-7 using 1×1×4 lbs (November 1975). Pressure Sensitive Tape Council. Results of this test are reported in hours/500 gm/0.25 in$^2$ at 22° C.

3. Polyken Tack Test

This test is conducted on a Polyken, Jr. Probe Tack Tester (Polyken is a trademark of the Kendall Company) supplied by Testing Machines, Inc. (Amityville, N.Y.) under the following conditions:

Probe: 304 SS. 0.5 cm. diameter probe with a 280 grit abrasive finish.

Dwell Time: 1 second

Probe Contact Pressure: 100 gm/cm$^2$

Probe Retraction Rate: 1 cm/sec.

Annular Weight: 20 gm.–100 gm/cm$^2$ pressure of a 0.5 cm. diameter probe

Procedure: A one-inch square of MYLAR polyester film coated with the adhesive is placed on top of the annular weight so that the hole is completely covered by the adhesive area and this assembly placed in the weight carrier well. The machine is activated and the sequence of probe pressure and probe retraction automatically accomplished. The force required to free the probe from adhesive coated film, measured in grams/cm$^2$ is read from the indicator dial on the machine.

4. Adhesive Failure Code

C=clean, adhesive failure gh=ghosting

PT=partial transfer

TT=total transfer

Example 1

A typical formulation of the invention PSA is as follows:

TABLE 1

Composition of 6448-79 Latex

| Component | Wt % Based on Latex |
| --- | --- |
| Water | 51.80 |
| Sodium bicarbonate | 0.10 |
| Hitenol BC-10* | 1.12 |
| 70% t-Butyl hydroperoxide | 0.19 |
| 2-Ethyl hexylacrylate | 32.27 |
| Styrene | 7.61 |
| Methyl methacrylate | 3.81 |
| β-carboxyethyl acrylate | 2.48 |
| Methacrylic acid | 1.50 |
| Zinc formaldehyde sulfoxylate | 0.12 |

*Hitenol BC-10 is poly(oxy-1,2-ethanediyl),α-sulfo-ω-[4-nonyl-2-(1-propenyl)phenyoxy]-branched ammonium salts; yellowish brownish viscous liquid, 97.0% actives, combined sulfuric acid content of 8.70–9.70%, pH of 6.5–8.5 (1% aqueous solution), supplied by Montello, Tulsa, OK.

A typical synthesis is set forth below.

Preparation of the Pre-Emulsion

To a 500 ml. pre-emulsion vessel equipped with a turbine agitator was charged de-ionized water (64.8 g.), NaHCO$_3$ (0.4 g.), 70% t-butyl hydroperoxide initiator (t-BHP, 0.60 g.), and Hitenol BC-10 polymerizable anionic surfactant (3.6 g.). The agitation was adjusted to 400 rpm. A monomer solution consisting of beta-carboxyethyl acrylate (βCEA, 10.0 g.)methacrylic acid (MAA, 2.0 g.), methyl methacrylate (MMA, 15.33 g.), 2-ethylhexyl acrylate (2-EHA, 129.9 g), and styrene (30.65 g.) then was slowly added to the vessel. Agitation of the emulsion was continued for 35 minutes after which the pre-emulsion was transferred to the reservoir of a metering pump system for eventual delivery to the polymerization reaction vessel.

Preparation of the Reducing Agent Feed Solution

A solution of zinc formaldehyde sulfoxylate (ZFS, 0.35 g) in de-ionized water (12.0 g) was prepared and added to the reservoir of a peristaltic pump for eventual deliver to the polymerization reaction vessel.

Reactor Charge and Polymerization

To a 500 ml. reaction vessel equipped with a turbine agitator, thermocouple, heating mantle, temperature regulating device, $N_2$ sparge, and delivery lines for the pre-emulsion and reducing agent, was added de-ionized water (118.1 g.) and Hitenol BC-10 polymerizable surfactant (0.90 g). A $N_2$ sparge was started, the agitation set at 200 rpm, and the heating mantle was turned on. When the temperature reached 60° C., the $N_2$ sparge was turned off and 4% (~12 ml.) of the pre-emulsion was pumped into the reaction vessel. When the temperature reached 70° C., a single addition of ZFS reducing agent (0.07 g.) solution in de-ionized water (5.0 g.) was added. Formation of a translucent blue dispersion within a few minutes indicated that the polymerization had initiated. Heating was continued to the controlled polymerization temperature of 80° C., whereupon the pre-emulsion and ZFS reducing agent feeds were started. The addition rates were adjusted to complete the deliveries over a three-hour time period at a reaction temperature of 80° C. Ten minutes after completion of the feeds, additional initiator (70% t-BHP, 0.075 g.) in de-ionized water (1.25 g.) was added, followed after another 10 minutes reaction time by additional ZFS reducing agent (0.03 g.) in de-ionized water (1.25 g.). The reaction was held at 80° C. for one additional hour after which cooling was started. When the temperature reached 50° C. additional initiator (70% t-BHP, 0.075 g.) in de-ionized water (1.25 g.) was added, followed after another 10 minutes by additional ZFS reducing agent (0.03 g.) in de-ionized water (1.25 g.). Cooling was continued to a temperature <30° C. at which point the latex was removed.

Additional formulations were compounded like latex 6448-79 and evaluated for its properties. The formulations evaluated and results recorded are set forth below:

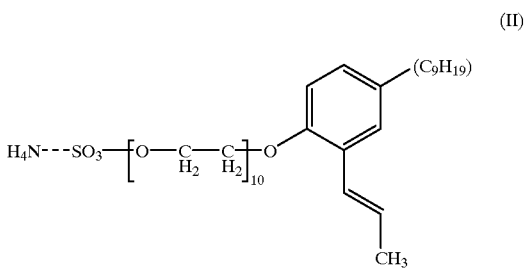

(II)

wherein said latex emulsion is made from a monomer mixture that includes beta-carboxyethyl acrylate.

2. The PSA of claim 1, wherein said monomer mixture further consists essential of:
   a) at least one alkyl acrylate having at least 4 carbon atoms in the alkyl group,
   b) at least one ethylenically unsaturated carboxylic acid or its corresponding anhydride, and
   c) at least one styrenic monomer, in the presence of said emulsifier and a redox type free radical initiator system.

3. The pressure sensitive adhesive of claim 2, wherein the alkyl group of said alkyl acrylate having at least 4 carbon atoms in the alkyl group is one or more of butyl acrylate, 2-ethylhexyl acrylate, heptyl acrylate, octyl acrylate, isooctyl acrylate, isobutyl acrylate, or isodecyl acrylate.

4. The pressure sensitive adhesive of claim 2, where the ethylenically unsaturated carboxylic acid or its corresponding anhydride is one or more of acrylic acid, methacrylic acid, beta-carboxyethyl acrylate, maleic acid, fumaric acid, itaconic acid, or maleic anhydride.

TABLE 2

| % BOM | Run 6448– | | | | | | | | |
|---|---|---|---|---|---|---|---|---|---|
| | 73 | 75 | 79 | 81 | 85 | 87 | 91 | 93 | 95 |
| 2-Ethyl hexylacrylate | | | | | | | | | |
| Styrene | 0 | 16.31 | 16.31 | 8.16 | 16.31 | 8.16 | 0 | 0 | 0 |
| Methyl methacrylate | 32.62 | 16.31 | 8.16 | 16.31 | 8.16 | 16.31 | 16.31 | 16.31 | 16.31 |
| β-carboxyethyl acrylate | 5.32 | 5.32 | 5.32 | 5.32 | 5.32 | 3.57 | 5.32 | 5.32 | 5.32 |
| Methacrylic acid | 1.06 | 1.06 | 1.06 | 1.06 | 1.06 | 0 | 1.06 | 1.06 | 1.06 |
| Hitenol BC-10 | 2.4 | 2.4 | 2.4 | 2.4 | 3.6 | 3.6 | 3.6 | 4.8 | 4.8 |
| TEST RESULTS | | | | | | | | | |
| Shear (1 × 1 × 4 lb) | 144+ | 144+ | 102.6 cf | 104 cf | 87+ | 15.9 cf | 11.5 cf | 12.4 cf | 35.7 cf |
| 15 min. peel | 2.3 cl | 2.4 cl | 2.2 cl | 2.2 cl | 2.3 cl | 2.32 cl | 1.9 cl | 1.5 cl | 1.5 cl |
| 24 hr peel | 3.0 cl | 3.5 cl | 3.2 cl | 3.1 cl | 3.0 cl | 2.9 cl | 2.8 cl | 2.4 cl | 2.3 cl |
| Polyken tack test | 40 | 67 | 183 | 107 | 151 | 197 | 203 | 242 | 218 |
| Particle Size (nm) | 100 | 86.1 | 86 | 88 | 81.8 | 81.5 | 92 | 86.4 | 97.6 |
| Blush (days) (tap water immersion) | 19+ | 16+ | 2 | 14+ | 10+ | 6 | 7+ | 4+ | 3+ |

The above-tabulated results demonstrate the remarkable properties exhibited by he inventive PSA's that utilize an aqueous latex emulsion PSA that employs a reactive emulsifier as the only emulsifier used to make the latex emulsion. Addition of non-reactive emulsifiers, while a small amount is tolerable, will degrade the otherwise excellent performance exhibited by the inventive PSA's.

What is claimed is:

1. An aqueous, blush-retardant pressure sensitive adhesive (PSA), which comprises:
   an aqueous latex emulsion having an average particle size diameter of not substantially above about 100 nm and emulsified in the presence of an emulsifier consisting essentially of:

5. The pressure sensitive adhesive of claim 2, wherein the styrenic monomer is one or more of styrene, tert-butyl styrene, dimethyl styrene, or vinyl toluene.

6. A laminate comprising:
   (a) a release liner,
   (b) a facestock, and
   (c) the PSA of claim 1 between and adhering the release liner and facestock.

7. A tape comprising:
   a wound roll facestock having an exterior side and an interior side, the interior side coated with the PSA of claim 1.

* * * * *